United States Patent
Huang

(10) Patent No.: US 10,460,359 B1
(45) Date of Patent: Oct. 29, 2019

(54) COMPUTER-IMPLEMENTED METHOD FOR ARRANGING HYPERLINKS ON A GRAPHICAL USER-INTERFACE

(71) Applicant: Coupang Corp., Seoul (KR)

(72) Inventor: Xiaojun Huang, Shanghai (CN)

(73) Assignee: Coupang, Corp., Seoul (KR)

( * ) Notice: Subject to any disclaimer, the term of this patent is extended or adjusted under 35 U.S.C. 154(b) by 0 days.

(21) Appl. No.: 16/367,891

(22) Filed: Mar. 28, 2019

(51) Int. Cl.
| | |
|---|---|
| *G06F 16/00* | (2019.01) |
| *G06Q 30/02* | (2012.01) |
| *G06F 16/957* | (2019.01) |
| *G06Q 30/06* | (2012.01) |
| *G06F 16/958* | (2019.01) |
| *G06F 16/955* | (2019.01) |
| *G06F 16/9538* | (2019.01) |

(52) U.S. Cl.
CPC ....... *G06Q 30/0282* (2013.01); *G06F 16/958* (2019.01); *G06F 16/9538* (2019.01); *G06F 16/9558* (2019.01); *G06F 16/9577* (2019.01); *G06Q 30/0631* (2013.01); *G06Q 30/0641* (2013.01)

(58) Field of Classification Search
CPC .................................................. G06F 16/9538
See application file for complete search history.

(56) References Cited

U.S. PATENT DOCUMENTS

2008/0071692 A1* 3/2008 Jain .................... G06Q 30/0601
705/80

2014/0207769 A1* 7/2014 Marbach ............... G06F 16/285
707/723

(Continued)

OTHER PUBLICATIONS

Tseng et al.; FrauDetector: A Graph-Mining-based Framework for Fraudulent Phone Call Detection; 2015 (10 pages).

*Primary Examiner* — Grace Park
(74) *Attorney, Agent, or Firm* — Finnegan, Henderson, Farabow, Garrett & Dunner, LLP

(57) ABSTRACT

Methods and systems for arranging hyperlinks on a graphical user-interface (GUI) of a computerized system include receiving, via the GUI, a user selection to display a plurality of hyperlinks, the hyperlinks corresponding to one or more nodes of a first set. The methods and systems further include determining, by a processor, a rank of each hyperlink in the plurality of hyperlinks. Determining a rank includes constructing a first bipartite graph between the one or more nodes of the first set and one or more nodes of a second set, the first set and the second set being mutually exclusive, wherein edges of the first bipartite graph are weighted according to a first criterium and constructing a second bipartite graph between the one or more nodes of the first set and the one or more nodes of the second set, wherein edges of the second bipartite graph are weighted according to a second criterium, different from the first criterium. The first bipartite graph and the second bipartite graph are aggregated to form an aggregated bipartite graph. The one or more hyperlinks are ranked ordinally according to an aggregate weight of the corresponding node in the aggregate bipartite graph. The first-ranked hyperlink is automatically moved to a first position on the GUI and the second and subsequently ranked hyperlinks are automatically moved to second and subsequent positions, respectively, on the GUI.

19 Claims, 10 Drawing Sheets

(56) References Cited

U.S. PATENT DOCUMENTS

2016/0048556 A1* 2/2016 Kelly .................. G06F 16/9535
707/767
2016/0364753 A1* 12/2016 Zhang ................ G06Q 30/0255

* cited by examiner

FIG. 2A

| Link 225 | Unit Price + Shipping 221 | Promised Delivery Date (PDD) 222 | Seller Trust Rating (STR) 223 | Seller ID 224 |
|---|---|---|---|---|
| ☒ | 20,000 KRW | 11/28 | 97 | Farm Imports Inc. (S304858568) |
| ▨ | 19,500 KRW | 11/29 | 94 | SUPER Market (S109495830) |
| ▨ | 20,700 KRW | 11/28 | 83 | Double Dairy (S304859493) |
| ▨ | 20,500 KRW | 11/28 | 68 | EZ Cheesy (S348429100) |
| ▨ | 19,750 KRW | 11/30 | 46 | Super Brands Ltd. (S039384810) |
| ... | ... | ... | ... | ... |

| Transaction ID 408 | Buyer ID 401 | Seller ID 402 | Date 403 | Value 404 | On-Time Delivery? 405 | Buyer Rating 406 | Seller Rating 407 |
|---|---|---|---|---|---|---|---|
| 20190003245444 | B304858568 | S304858568 | 20190909 | 239,945.44 KRW | -1 | 4.5 | 5.0 |
| 20190003245490 | B271949057 | S348429100 | 20190922 | 1,459.8619 KRW | +2 | 3.0 | 5.0 |
| 20190003365144 | B494820290 | S304859493 | 20190927 | 40,152.75 KRW | +2 | 4.0 | 3.5 |
| 20190005545403 | B094310990 | S109495830 | 20190040 | 135,500.00 KRW | -2 | 5.0 | 4.0 |
| 20190010634476 | B058943839 | S039384810 | 20198055 | 13,549.81 KRW | +7 | 2.0 | 5.0 |

FIG. 4

COMPUTER-IMPLEMENTED METHOD FOR ARRANGING HYPERLINKS ON A GRAPHICAL USER-INTERFACE

TECHNICAL FIELD

The present disclosure generally relates to computerized systems and methods for arranging hyperlinks on a graphical user-interface (GUI) of such a system. Embodiments of the present disclosure relate to inventive and unconventional systems for displaying hyperlinks, such as icons, radio buttons, or hyperlinked text, ranked according to specific factors.

BACKGROUND

With the proliferation of the Internet, more and more users are accessing more and more information online. Often, the same type of information is available from multiple online sources, each with markedly different utility and reliability. As the scope and volume of our electronic interactions continues to grow, there is a greater need for systems and methods for ranking online sources, so that users may quickly find the most useful and reliable sources of the information they are seeking.

Conventional search engines use link analysis algorithms, such as Hyperlink-Induced Topic Search (HITS) algorithms to rank search results. Starting from a simple keyword search, a HITS algorithm identifies "hubs" and "authorities" related to the search string by assigning each page an authority weight and a hub weight. "Authorities" are webpages that contain authoritative information on the search topic. "Hubs" are pages that point or link to these authorities. The authority weight and hub weight are defined recursively: a higher authority weight is given to pages that are pointed to by many pages with high hub weights, while a higher hub weight is given to pages that point to many pages with high authority weights. By recursively following the links between webpages, the HITS algorithm can identify the "most authoritative" webpages on a given topic, even if those webpages do not themselves include the initial search string.

Similarly, with more and more transactions being conducted online, there is also a greater need for systems and methods for accurately ranking vendors in online marketplaces. In such marketplaces, the same goods may be made available for purchase online from different vendors at different prices. In addition to these price differences, however, the vendors themselves may vary in trustworthiness and reliability. For example, some vendors may fail to deliver the goods by the promised date or otherwise fail to provide good customer service. Some vendors may deliver goods that are in poor condition, or past their expiration date. And some vendors may misuse credit card information that is entrusted to them. As a result of these types of irregularities, some vendors may develop a reputation as unreliable, untrustworthy, and unworthy of a customer's business.

In online or electronic commerce (e-commerce) marketplaces, an individual vendor's reputation is often expressed in terms of, for example, a star rating (e.g., from one to five stars), a letter grade, or the percent of positive or negative reviews that buyers have provided to ratings websites or online marketplaces regarding that vendor. However, such ratings are often subjective and open to interpretation. Moreover, because not all buyers will provide a rating or review (whether positive or negative), existing rating systems cannot provide a complete picture of a vendor's reputation.

Existing rating systems are also subject to manipulation. For example, the HITS algorithm may be manipulated to a certain extent by so-called "link farms" designed to make a spam page appear to be authoritative on a given search topic by generating thousands of fake hubs linking the spam page to that topic. Similarly, existing vendor ratings pages may be manipulated by unscrupulous vendors submitting fake positive reviews of themselves—or fake negative of their competitors. Existing ratings systems thus raise questions regarding the trustworthiness and reliability of the methods used to provide the ratings or reviews, as well as the trustworthiness and reliability of the webpages and e-commerce vendors that are the subject of those reviews.

There is thus a need for ranking systems that are less subjective and subject to manipulation.

SUMMARY

One aspect of the present disclosure is directed to a system including a memory storing instructions and at least one processor programmed to execute the instructions to perform a method for arranging hyperlinks on a graphical user-interface (GUI) of a computerized system. The method includes receiving, via the GUI, a user selection to display a plurality of hyperlinks, the hyperlinks corresponding to one or more nodes of a first set. The method further includes determining, by a processor, a rank of each hyperlink in the plurality of hyperlinks. Determining a rank includes constructing a first bipartite graph between the one or more nodes of the first set and one or more nodes of a second set, the first set and the second set being mutually exclusive, wherein edges of the first bipartite graph are weighted according to a first criterium and constructing a second bipartite graph between the one or more nodes of the first set and the one or more nodes of the second set, wherein edges of the second bipartite graph are weighted according to a second criterium, different from the first criterium. The first bipartite graph and the second bipartite graph are aggregated to form an aggregated bipartite graph. The one or more hyperlinks are ranked ordinally according to an aggregate weight of the corresponding node in the aggregate bipartite graph. The first-ranked hyperlink is automatically moved to a first position on the GUI and the second and subsequently ranked hyperlinks are automatically moved to second and subsequent positions, respectively, on the GUI.

Another aspect of the present disclosure is directed to a method for arranging hyperlinks on a graphical user-interface (GUI) of a computerized system. The method includes receiving, via the GUI, a user selection to display a plurality of hyperlinks, the hyperlinks corresponding to one or more nodes of a first set. The method further includes determining, by a processor, a rank of each hyperlink in the plurality of hyperlinks. Determining a rank includes constructing a first bipartite graph between the one or more nodes of the first set and one or more nodes of a second set, the first set and the second set being mutually exclusive, wherein edges of the first bipartite graph are weighted according to a first criterium and constructing a second bipartite graph between the one or more nodes of the first set and the one or more nodes of the second set, wherein edges of the second bipartite graph are weighted according to a second criterium, different from the first criterium. The first bipartite graph and the second bipartite graph are aggregated to form an aggregated bipartite graph. The one or more hyperlinks are ranked ordinally according to an aggregate weight of the corresponding node in the aggregate bipartite graph. The first-ranked hyperlink is automatically moved to a first position on the GUI and the second and subsequently ranked hyperlinks are automatically moved to second and subsequent positions, respectively, on the GUI.

Yet another aspect of the present disclosure is directed to a non-transitory computer-readable storage medium that comprises instructions that may be executed by a processor to perform a method for arranging hyperlinks on a graphical user-interface (GUI) of a computerized system. The method includes receiving, via the GUI, a user selection to display a plurality of hyperlinks, the hyperlinks corresponding to one or more nodes of a first set. The method further includes determining, by a processor, a rank of each hyperlink in the plurality of hyperlinks. Determining a rank includes constructing a first bipartite graph between the one or more nodes of the first set and one or more nodes of a second set, the first set and the second set being mutually exclusive, wherein edges of the first bipartite graph are weighted according to a first criterium and constructing a second bipartite graph between the one or more nodes of the first set and the one or more nodes of the second set, wherein edges of the second bipartite graph are weighted according to a second criterium, different from the first criterium. The first bipartite graph and the second bipartite graph are aggregated to form an aggregated bipartite graph. The one or more hyperlinks are ranked ordinally according to an aggregate weight of the corresponding node in the aggregate bipartite graph. The first-ranked hyperlink is automatically moved to a first position on the GUI and the second and subsequently ranked hyperlinks are automatically moved to second and subsequent positions, respectively, on the GUI.

Other systems, methods, and computer-readable media are also discussed herein.

BRIEF DESCRIPTION OF THE DRAWINGS

FIG. 2A depicts a sample Search Result Page (SRP) that includes one or more search results satisfying a search request along with interactive user interface elements, consistent with the disclosed embodiments.

FIG. 2C depicts a sample Seller Listing that includes information about sellers of the product within the marketplace along with interactive user interface elements, consistent with the disclosed embodiments.

FIG. 4 shows sample transaction data, consistent with the disclosed embodiments.

DETAILED DESCRIPTION

Figure 1:
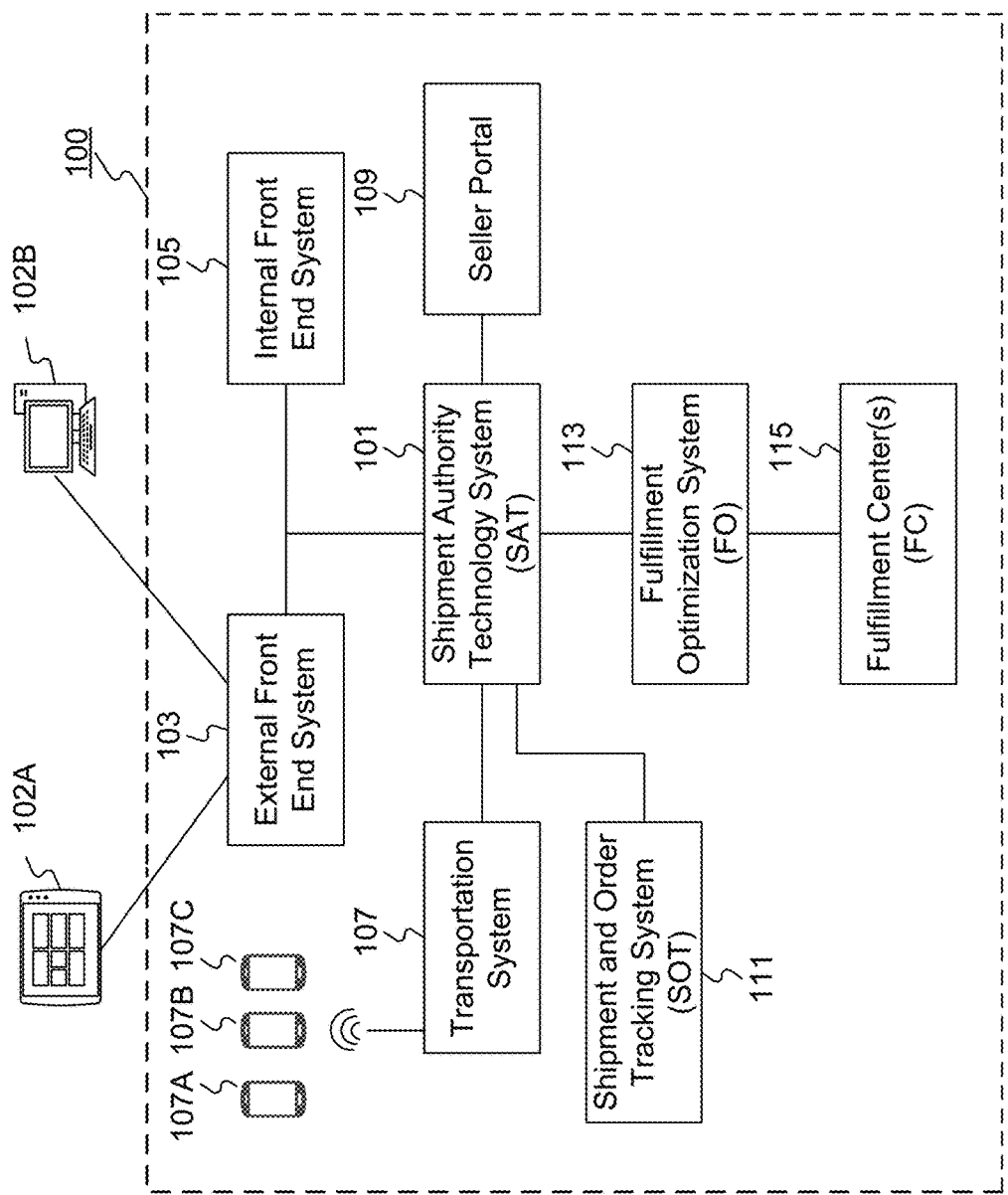
FIG. 1 is a schematic block diagram illustrating an exemplary embodiment of a network comprising computerized systems for communications enabling shipping, transportation, and logistics operations, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods, or by performing non-dependent steps in parallel with each other. Accordingly, the following detailed description is not limited to the disclosed embodiments and examples. Instead, the proper scope of the invention is defined by the appended claims.

Embodiments of the present disclosure are directed to systems and methods for arranging hyperlinks on a graphical user-interface (GUI) of a computerized system.

FIG. 1 shows a schematic block diagram 100 of an exemplary embodiment of a computerized system in which embodiments of the present disclosure may be implemented. In FIG. 1, system 100 is configured for enabling shipping, transportation, and logistics operations relating to an e-commerce marketplace. However, the present disclosure is not restricted to e-commerce systems and may also be implemented in a general search engine.

As illustrated in FIG. 1, system 100 may include a variety of constituent systems, which may be connected to one another via one or more networks. These constituent systems may also be connected to one another via direct connections, e.g., using direct data links. In the e-commerce marketplace shown in FIG. 1, the depicted systems include a shipment authority technology (SAT) system 101, an external front-end system 103, an internal front-end system 105, a transportation system 107, mobile devices 107A, 107B, and 107C, seller portal 109, shipment and order tracking (SOT) system 111, fulfillment optimization (FO) system 113, and fulfillment center (FC) 115.

In some embodiments, SAT system 101 may be implemented as a computer system that monitors the status of orders and deliveries in an e-commerce marketplace. For example, SAT system 101 may determine whether an order is past its promised delivery date (PDD) and may take appropriate action, including initiating a new order, reshipping the items in the non-delivered order, canceling the non-delivered order, initiating contact with the ordering customer, or the like. SAT system 101 may also act as a gateway between different devices in system 100, enabling communication (e.g., using store-and-forward or other techniques) between devices such as external front-end system 103 and FO system 113.

In some embodiments, internal front-end system 105 may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front-end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front-end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front-end system 105 may comprise one or more of these systems, while in another aspect, internal front-end system 105 may comprise interfaces (e.g., server-to-server, database-to-database, or other network connections) connected to one or more of these systems.

In some embodiments, seller portal 109 may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

In some embodiments, shipment and order tracking system 111 may be implemented as a computer system that receives, stores, and forwards information regarding the location of packages containing products ordered by customers (e.g., by a user using devices 102A-102B). In some embodiments, shipment and order tracking system 111 may request or store information from web servers (not illustrated) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). Shipment and order tracking system 111 may request data from one or more of transportation system 107 or WMS 119, process it, and present it to a device (e.g., user devices 102A and 102B) upon request.

Fulfillment center 115 represents one or more physical location that stores items for shipping to customers when ordered.

In some embodiments, fulfillment optimization (FO) system 113 may be implemented as a computer system that stores information for customer orders from other systems (e.g., external front-end system 103 and/or shipment and order tracking system 111). FO system 113 may also store information describing where particular items are held or stored. For example, certain items may be stored only in one fulfillment center 115, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. In some embodiments, the PDD may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 115, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front-end system 103, SAT system 101, shipment and order tracking system 111). In other embodiments, FO system 113 may receive electronic requests from one or more systems (e.g., external front-end system 103, SAT system 101, shipment and order tracking system 111) and calculate the PDD on demand.

In some embodiments, external front-end system 103 may be implemented as a computer system that enables external users to interface with an e-commerce marketplace. For example, external front-end system 103 may be implemented as a computer or computers running software such as the Apache HTTP Server, Microsoft Internet Information Services (IIS), NGINX, or the like.

In some embodiments, external front-end system 103 may be implemented as a web server that presents a graphical user interface (GUI) to enable users to place orders for items offered for sale in the e-commerce marketplace. In such an embodiment, the external front-end system 103 may receive search requests, presents item pages, and solicit payment information.

In other embodiments, external front-end system 103 may be implemented as a web server that presents a graphical user interface (GUI) to enable users to conduct electronic searches. In such embodiments, external front-end system 103 may run custom web server software designed to receive and process requests from external devices (e.g., mobile device 102A or computer 102B), acquire information from databases and other data stores based on those requests, and provide responses (e.g., a ranked listing of search results) based on the acquired information.

In some embodiments, external front-end system 103 may include one or more of a web caching system, a database, a search system, or a payment system. In one aspect, external front-end system 103 may comprise one or more of these systems, while in another aspect, such systems may be hosted elsewhere within system 100 and external front-end system 103 may include interfaces (e.g., server-to-server, database-to-database, or other network connections) to such systems.

FIGS. 2A, 2B, 2C, 2D, and 2E illustrate some operations of external front-end system 103. External front-end system 103 may receive information from systems or devices in system 100 for presentation and/or display on a graphical user interface (GUI). For example, external front-end system 103 may host or provide one or more web pages, including a Search Result Page (SRP) (e.g., FIG. 2A), a single detail page (SDP) (e.g., FIG. 2B), a seller listing (e.g., FIG. 2C), a cart page (e.g., FIG. 2D), and/or an order page (e.g., FIG. 2E).

A user device (e.g., using mobile device 102A or computer 102B) may navigate to external front-end system 103 and request a search by entering information into a search box. External front-end system 103 may request information from one or more systems in system 100. For example, external front-end system 103 may request information from FO System 113 that satisfies the search request.

External front-end system 103 may prepare an SRP (e.g., FIG. 2A) based on the information received in response to its query. The SRP may include information that satisfies the search request. For example, this may include pictures of products that satisfy the search request. The SRP may also include respective prices for each product, or information relating to enhanced delivery options for each product, PDD, weight, size, offers, discounts, or the like, as offered by the top-rated seller of the product (described below). External front-end system 103 may send the SRP to the requesting user device (e.g., via a network) for display on the user's GUI.

A user device may then select a product from the SRP, e.g., by clicking or tapping a user interface (e.g., using a mouse, pen, touchscreen, or other pointing device) or using another input device (e.g., a button or keyboard) to select a product represented on the SRP. In response to such an input, the user device may formulate a request for further information on the selected product and send it to external front-end system 103.

In response to such a selection, external front-end system 103 may request and receive further information regarding the selected product (e.g., from FO System 113). For example, this additional information may include information regarding the product's shelf life, country of origin, weight, size, handling instructions, or other information about the product. The information may also include recommendations for similar products (based on, for example, big data and/or machine learning analysis of past transactions by customers who bought this product and at least one other product), answers to frequently asked questions regarding the product, product reviews by other customers, manufacturer information, pictures, or the like.

In order to convey this information to the user, external front-end system 103 may prepare an SDP (Single Detail Page) (e.g., FIG. 2B) based on the received product information. The SDP may include an identification of the top-rated seller of the product (in this case, "Farm Imports Inc."), as well as the price (in this case 20,000 KRW), and promised delivery date (PDD) (in this case "Tomorrow (Wed) 11/28") offered by the top-rated seller. The PDD may represent an estimate of when a package containing the product will arrive at the user's desired location or a date by which the product is promised to be delivered at the user's desired location if ordered within a certain period, e.g., by 1:59:59 PM.

The SDP may also include other interactive elements such as a "Buy Now" button, a "Add to Cart" button, a quantity field, or the like, for use in executing an order. The SDP may further include a link 211 ("See Other Sellers") to a listing of other sellers of the same or similar products (e.g., FIG. 2C). Link 211 may be implemented using any of a number of graphical user interface (GUI) elements. For example, link 211 may be implemented as a button (including, e.g., a radio button or check box), an icon, or hyperlinked text, etc.

As used herein, the term "hyperlink" should be understood to include any appropriate type of user-selectable GUI element.

As shown in FIG. 2C, the seller listing 220 may show, e.g., the commodity price 221, promised delivery date (PDD) 222, seller trust rating (STR) 223, and identity of the seller 224. Seller listing 220 may also include a hyperlink 225 for selecting one of the listed sellers to complete the transaction. As explained in below in connection with FIGS. 3A and 3B, the seller listing (FIG. 2C) may arrange and display the seller listing in a ranked order.

Although the seller listing 220 is shown in FIG. 2C as being displayed in a page format, the seller listing may instead be displayed in other convenient formats. For example, the seller listing 220 may be displayed in a wheel format or drop-down menu format.

In one embodiment, the sellers may be initially ordered based solely on the seller trust rating (STR), which may be determined as described below in connection with FIG. 3B. In another embodiment, the sellers may be initially ordered based on the total cost of the item (i.e., price plus shipping cost) offered by each seller, such that the seller(s) that offers to sell the product at the lowest total cost may be listed first. Where several sellers offer the product at the same total cost, the several sellers may be ordered based on the STR. In another embodiment, the sellers may be initially ordered based on the promised delivery date (PDD) indicated by each seller, such that the seller(s) that offers to deliver the product soonest may be listed first. Where several sellers offer the same PDD, the several sellers may be ordered based on the STR.

In yet another embodiment, the sellers may be initially ordered based on, e.g., the total cost of the item (i.e., price plus shipping cost) offered by each seller, such that the seller(s) that offers to sell the product at the lowest total cost may be listed at the top. Where several sellers offer the product at the same total cost, the several sellers may be ordered based on the PDD. And where several sellers offer the product at the same total cost and PDD, the several sellers may be ordered based on the STR.

Figure 2A:
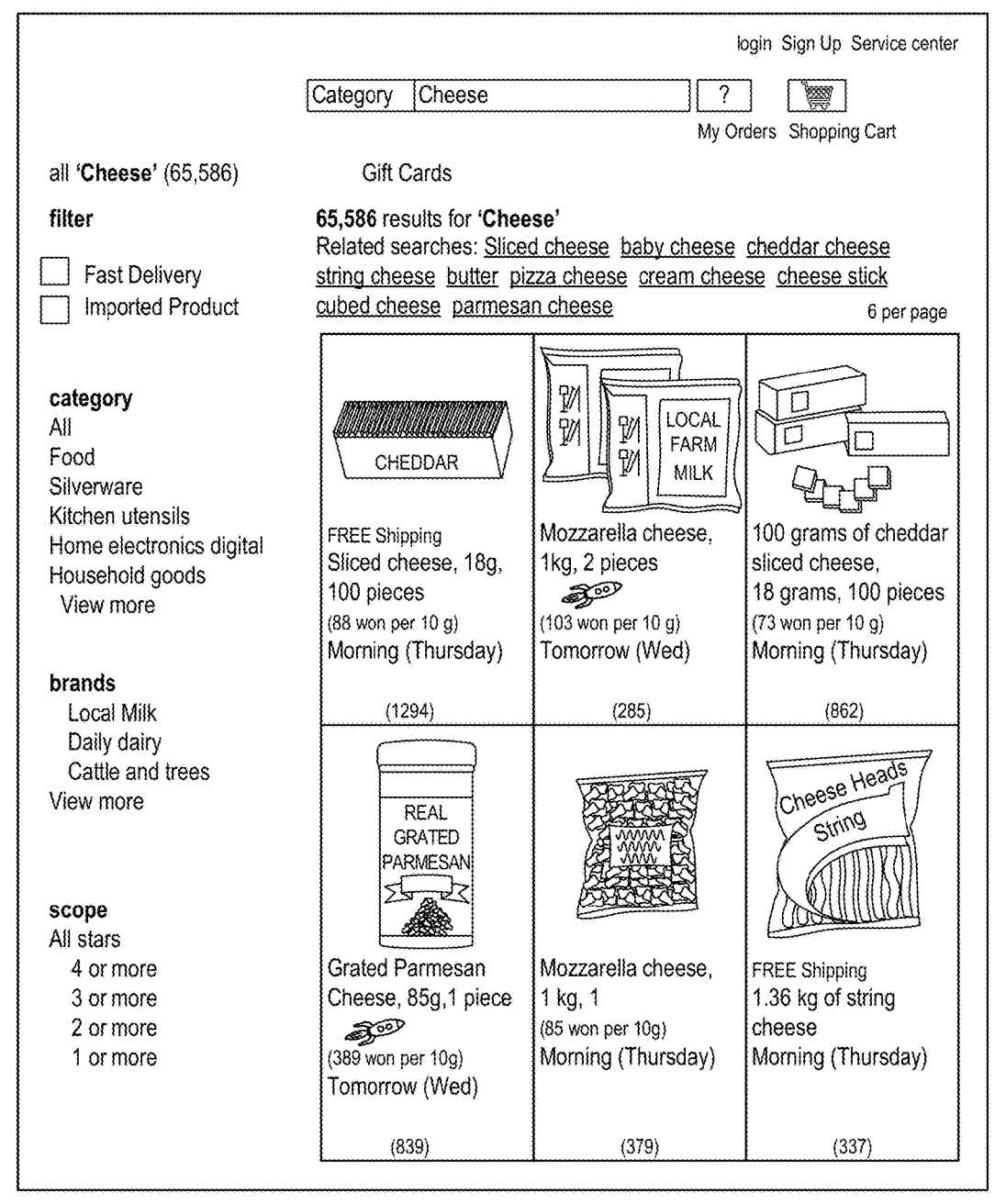
Figure 2B:
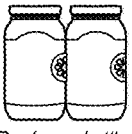
FIG. 2B depicts a sample Single Display Page (SDP) that includes a product and information about the product along with interactive user interface elements, consistent with the disclosed embodiments.

In each case, the seller with the highest STR (in this case, "Farm Import Inc.") may be shown on the Single Detail Page (SDP) (FIG. 2B), so that customers may quickly conduct a transaction with the highest-rated seller, without opening the seller listing 220 (FIG. 2C).

Figure 3A:
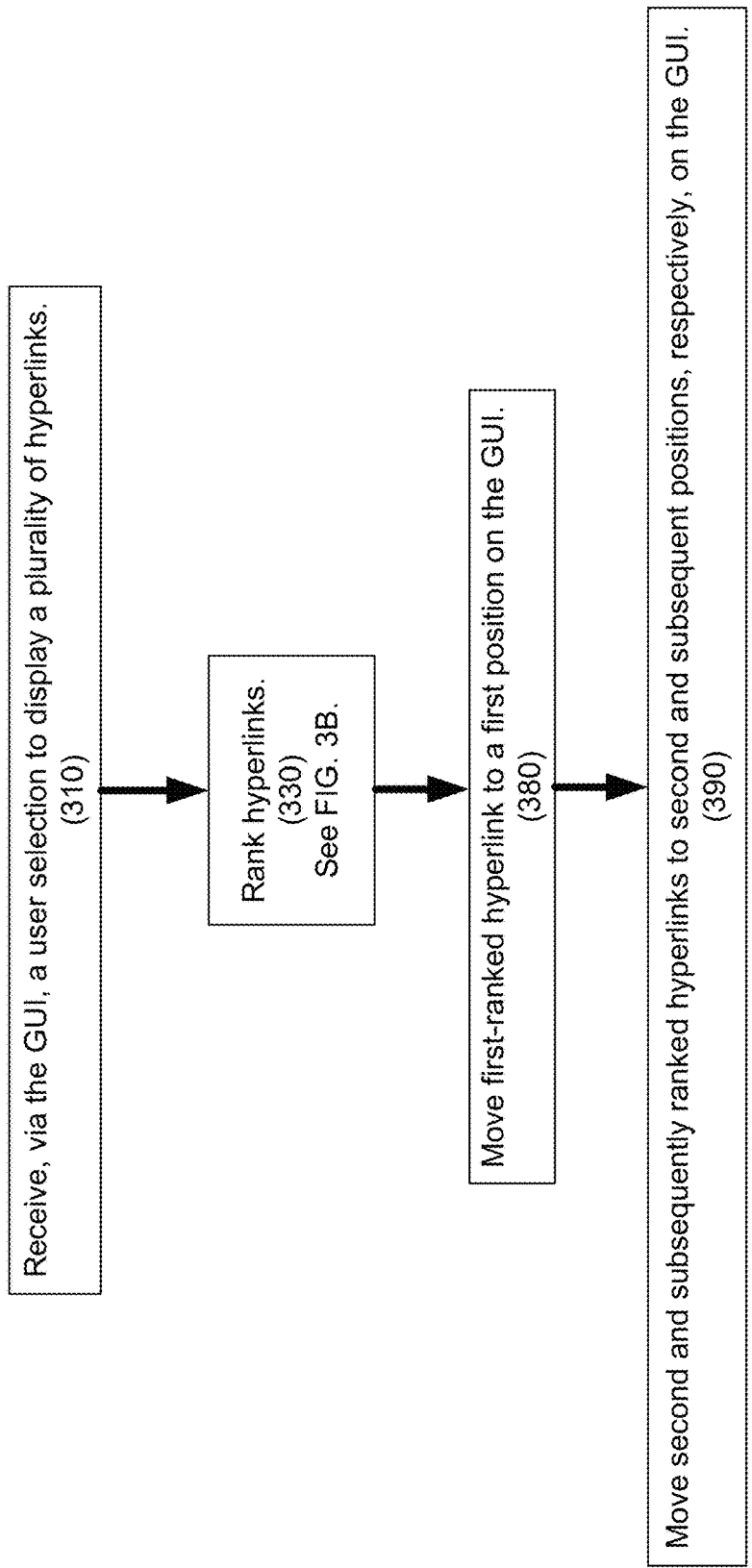
FIGS. 3A and 3B show a flowchart for performing a method for rearranging hyperlinks on a graphical user-interface (GUI) of a computerized system, consistent with the disclosed embodiments.
Figure 3B:
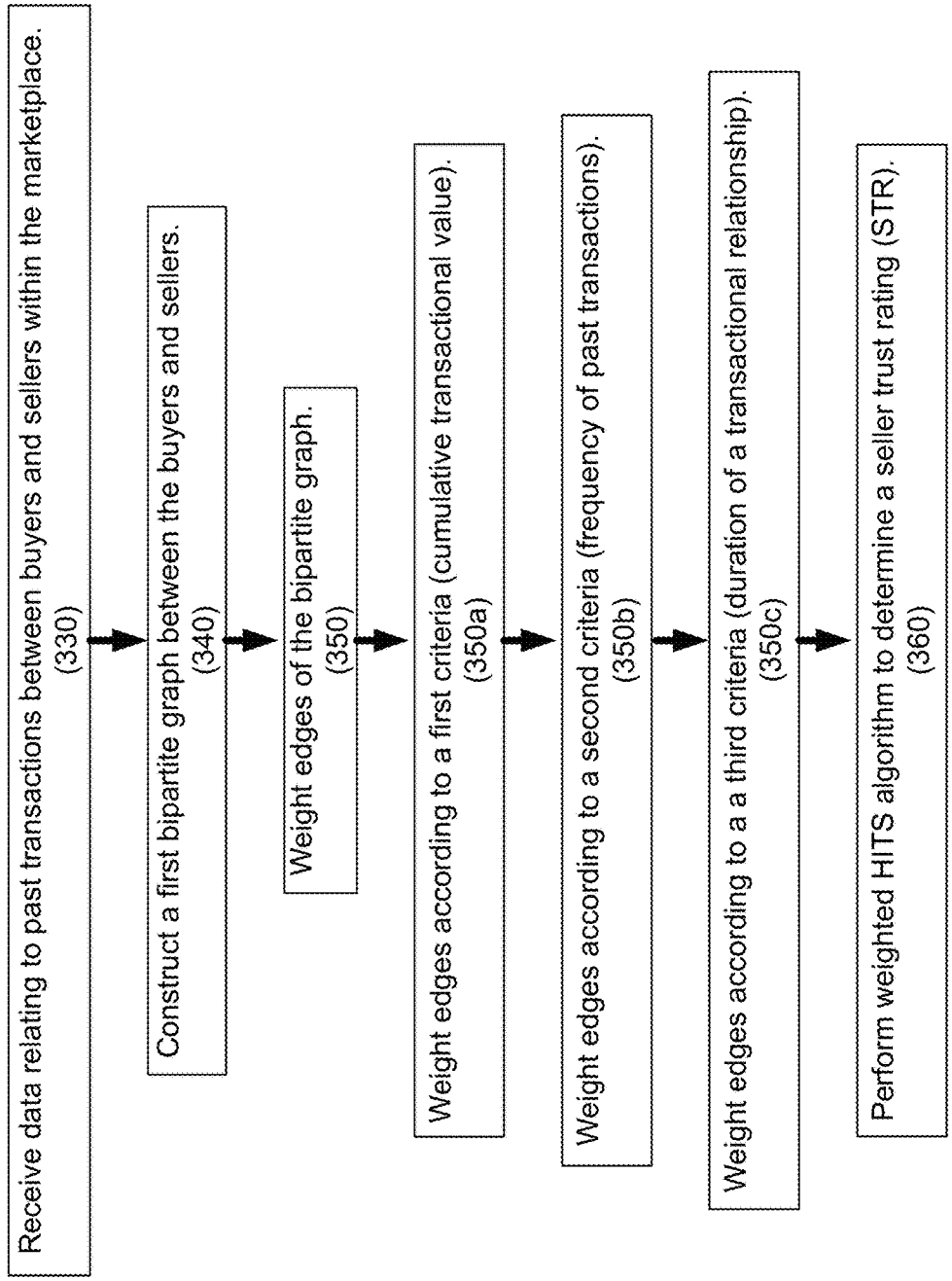

FIGS. 3A and 3B show an exemplary method 300 for arranging hyperlinks on a graphical user-interface (GUI) of a computerized system, such as links 225 in the seller listing 220 (FIG. 2C). The method or a portion thereof may be performed by system 100, or one or more of constituent systems 101, 105, 107, 109, 111, 112, 113, and 115. For example, the system may include one or more processors and a memory storing instructions that, when executed by the one or more processors, cause the system to perform the steps shown in FIGS. 3A and/or 3B.

In Step 310, the system may receive, via the GUI, a user selection to display a plurality of hyperlinks. For example, the system may receive a user input (e.g., from a button, keyboard, mouse, pen, touchscreen, or other pointing device) selecting link 211 ("See Other Sellers") in the interface display of FIG. 2B (Single Display Page (SDP)).

In Step 320, the system may determine a rank of each hyperlink in the plurality of hyperlinks. In one embodiment, for example, the system may determine a seller trust rating (STR) for each of the sellers in the seller listing 220 (FIG. 2C). An exemplary method of determining a seller trust rating is described below with respect to FIG. 3B.

In Step 330 (FIG. 3B), the system may receive data 400 relating to past transactions between buyers and sellers within the marketplace. As shown in FIG. 4, the transaction data 400 may include information relating to, e.g., a buyer ID 401, a seller ID 402, a transaction date 403, a transaction value 404, an On-Time Delivery (OTD) indicator 405, a buyer-supplied rating of the transaction 406, and a seller-supplied rating of the transaction 407.

The data 400 may be retrieved from one or more databases kept by one or more systems. For example, the data 400 may include data generated by, e.g., Fulfillment Optimization system 113 in association with fulfilling orders placed by a customer. The data may additionally or alternatively include data generated by, e.g., SAT system 101 in association with monitoring the order and delivery status of customer orders. In some embodiments, the transaction data may include a transaction ID 408 that uniquely identifies each transaction in the system and some or all of the remaining data items 401-407 may be retrieved from appropriate databases via one or more database queries based on the transaction ID 408.

The buyer ID 401 and the seller ID 402 may each be indicated by an alphanumeric or other ID that uniquely identifies the buyer and seller within the system. In some embodiments, for example, the buyer ID and the seller ID may be the corresponding login ID for the buyer and seller.

The transaction date 403 may be indicated by a numeric or alphanumeric string that uniquely identifies the date that the transaction occurred. In some embodiments, for example, the transaction date may identify the year and the day of the year (e.g., 001 to 365).

The transaction value 404 may include a numeric or alphanumeric string indicating a total value of the transaction in a common currency, such as U.S. dollars or South Korean Won. In some embodiments, the transaction value may exclude the cost of shipping the item or order. In other embodiments, the cost of shipping may be included in the transaction value.

The On-Time Delivery (OTD) indicator 405 may be a binary indication as to whether the order was delivered to the buyer on or before the promised delivery date. Alternatively, the OTD may be, e.g., a number indicating a magnitude of any delay. For example, the OTD indicator 405 may be an integer indicating the number of days that delivery was late (or early), determined by subtracting the promised delivery date (PDD) from the actual delivery date.

The buyer-supplied rating of the transaction 406 may be, e.g., a numerical score solicited from the buyer, rating their satisfaction with all or part of the transaction. For example, the buyer-supplied rating may be a score on a scale of, e.g., one to five stars; a score of 1 to 10 or 1 to 100, a letter grade, such as A+, A, B+, B, C+, C, or D; etc. Similarly, the seller-supplied rating of the transaction 306 may be, e.g., a score solicited from the seller, rating their satisfaction with all or part of the transaction.

Figure 5A:
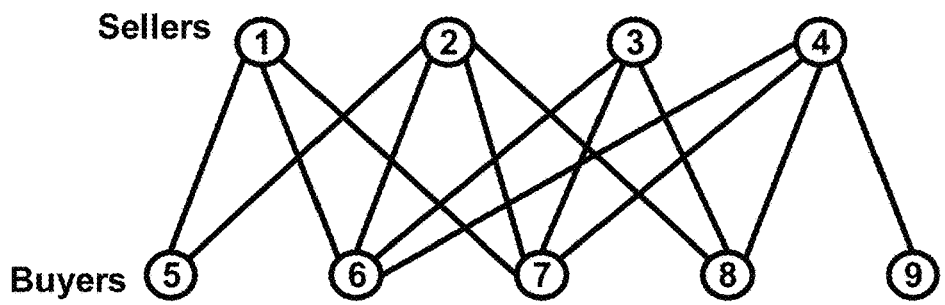
FIGS. 5A, 5B, 5C, and 5D are sample bipartite graphs, consistent with the disclosed embodiments.

In step 340, the transaction data is used to construct a first bipartite graph between the buyers and sellers. An exemplary bipartite graph is shown in FIG. 5A. As shown in FIG. 5A, for example, the set of sellers may be represented in the bipartite graph by one or more nodes 1-4 and the set of buyers may be represented by one or more nodes 5-9. The edges of the bipartite graph of FIG. 5A are unweighted and show only which buyers have transacted with which sellers. In FIG. 5A, for example, buyer node 5 has transacted with seller nodes 1 and 2, but not seller nodes 3 or 4.

In Step 350, the edges of the bipartite graph may be weighted according to one or more criteria. In one embodiment, for example, the edges of the bipartite graph may be weighted according to a value of past transactions conducted between the respective buyer and seller (Step 350a), e.g., in common currency such as U.S. dollars or South Korean Won. For example, an edge may be weighted according to a cumulative value of all past transactions conducted between the respective buyer and seller. Alternatively, an edge may be weighted according to a cumulative value of past transactions conducted between the respective buyer and seller within a set time frame, e.g., over the past year.

As another example, the edges may be weighted according to a frequency of past transactions between a respective buyer and seller (Step 350b). For example, the edges may be weighted according to the number of transactions, e.g., per month, per fiscal quarter, per year, etc.

As another example, the edges may be weighted according to a duration of a transactional relationship between the respective buyer and seller (Step 350c). For example, the edges may be weighted according to, e.g., the number of consecutive months or fiscal quarters with at least one transaction (or some other minimum number of transactions). As another example, instead of a minimum number of transactions, the edges may be weighted according to, e.g., the number of consecutive months or fiscal quarters in which a minimum cumulative transaction value is met.

Although the bipartite graph is shown graphically in FIGS. 5A-D, it will be understood that, in the computer-implemented method of FIG. 3B, bipartite graphs may be constructed using a weighted adjacency matrix whose elements have a value corresponding to the weights of the edges in the corresponding bipartite graph.

In particular, a bipartite graph G=(A, B, E), where E is the edge set and {A, B} is the bipartition, where A={a1, a2, . . . , am} and B={b1, b2, . . . , bn}, may be characterized by a square (0, 1)-adjacency matrix of order m+n, $$\begin{bmatrix} O & X \\ X^t & O \end{bmatrix}$$

where $X=[x_{ij}]$, $1 \le i \le m$, $1 \le j \le n$, and $x_{ij}=1$ if $a_i b_j \in E$, and $x_{ij}=0$ otherwise.

In some embodiments, the edges of the bipartite graph may be weighted according to multiple criteria. For example, the edges of the bipartite graph may be weighted according to a value of past transactions conducted between the respective buyer and seller (Step 350a); weighted according to a frequency of past transactions between a respective buyer and seller (Step 350b); and/or weighted according to a duration of a transactional relationship between the respective buyer and seller (Step 350c).

Figure 5B:
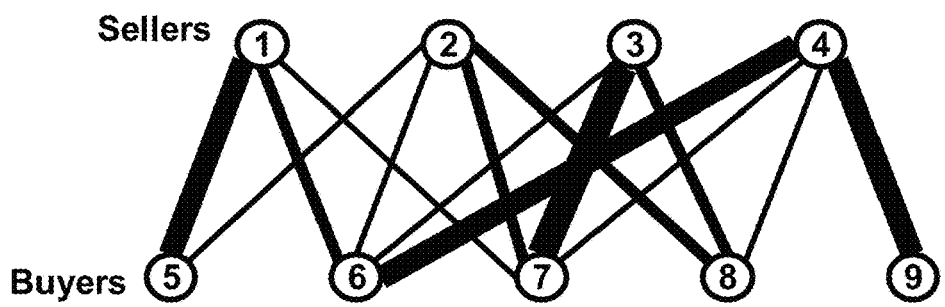
Figure 5C:
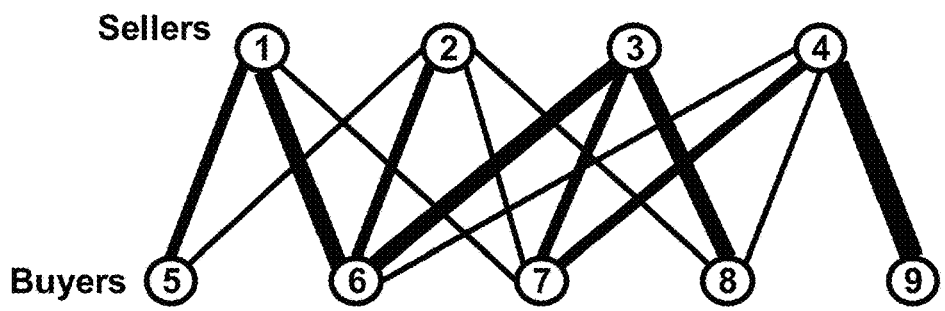

In such embodiments, the various weights may be aggregated by taking the algebraic sum of the weights. As shown in FIGS. 5B-C, for example, the unweighted bipartite graph of FIG. 5A may be weighted according to a first criterium (e.g., cumulative transactional value (Step 350a)), yielding a first weighted bipartite graph (FIG. 5B). The unweighted bipartite graph of FIG. 5A may also be weighted according to a second criterium (e.g., transactional frequency (Step 350b) and/or duration (Step 350c)), yielding a second weighted bipartite graph (FIG. 5C). The weights of the first and second bipartite graphs may be aggregated by taking the algebraic sum of the first bipartite graph (FIG. 5B) and the second bipartite graph (FIG. 5C), yielding an aggregated bipartite graph (FIG. 5D) whose edges are weighted according to the algebraic sum of the corresponding edges of the first bipartite graph (FIG. 5B) and the second bipartite graph (FIG. 5C).

Figure 5D:
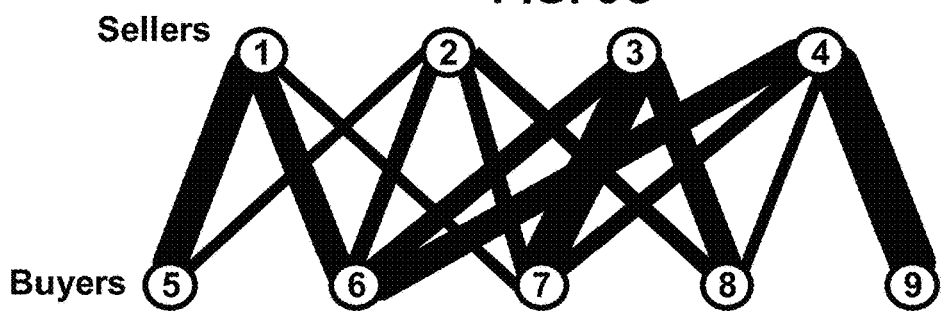

Although the edges of the first bipartite graph (FIG. 5B) and the second bipartite graph (FIG. 5C) are given equal weight in the aggregate bipartite graph of FIG. 5D, in some embodiments, the edges may be given different weights. In some embodiments, for example, the edges of the first bipartite graph (cumulative transactional value (Step 350*a*)) may be given more (or less) weight than the edges the second bipartite graph (e.g., transactional frequency (Step 350*b*) or duration (Step 350*c*)).

As explained above, for example, the first weighted bipartite graph (FIG. 5B) may be constructed using a first weighted adjacency matrix, and the second bipartite graph (FIG. 5C) may be constructed using a second weighted adjacency matrix. The first weighted adjacency matrix and the second weighted adjacency matrix may be multiplied by coefficients corresponding to their desired relative weights and then added to yield an aggregated adjacency matrix. In one embodiment, for example, the cumulative transactional value (Step 350*a*)) may be given twice as much weight as the transactional frequency (Step 350*b*), and the transactional frequency may be given twice as much weight as the transactional duration (Step 350*c*).

In Step 360, a weighted HITS algorithm is performed on the aggregated bipartite graph (FIG. 5D) to determine a seller trust rating for each seller in the seller listing. For example, the following HITS algorithm may be used:

```
01   X(s, b) ← weighted adjacency matrix of buyer-to-seller contacts
02   Y(b, s) ← weighted adjacency matrix of seller-to-buyer contacts
03   for each buyer b //determine hub weights u of buyers b
04      if the buyer b is confirmed fraudulent
05         u[b] ← −1 //flag the fraudulent account
06      otherwise
07
```
$$u[b] \leftarrow \frac{\sum_{s \in T} X(s, b)}{\sum_{b \in B} \sum_{s \in S} X(s, b)}$$

```
        //T is the set of sellers linked to buyer b
        //B is the set of buyers in the network
        //S is the set of sellers in the network
08   End if
09   End for
10   for each seller s //determine authority weights τ of sellers s
11      if the seller s is confirmed fraudulent
12         τ[s] ← −1 //fraudulent account
13      otherwise
14
```
$$\tau[s] \leftarrow \frac{\sum_{b \in C} Y(b, s)}{\sum_{s \in S} \sum_{b \in B} Y(b, s)}$$

```
        //C is the set of buyers linked to seller s
        //S is the set of sellers in the network
        //B is the set of buyers in the network
15   End if
16   End for
17   for iteration < N
     // N is the number of iterations chosen for convergence of τ and u
18      τ ← τ × 1/norm(τ) //normalize by the Euclidian norm
19      u ← u + X^T × τ
20      u ← u × 1/norm(u) //normalize by the Euclidian norm
21      τ ← τ + Y^T × u
22   End for
23   Return τ and u
```

The seller trust rating (STR) may be defined to be equal to the authority weight of the seller. In some embodiments, the STR may be normalized over, e.g., a 5-, a 10-, or a 100-point scale. Note that, in this example algorithm, the account of a buyer or seller that is confirmed to be fraudulent (e.g., through investigation of user complaints) may be flagged by assigning a negative hub or authority weight (e.g., −1) so as to avoid giving weight to sham accounts or transactions.

In Step 370 (FIG. 3A), the seller list 220 (FIG. 2C) and corresponding hyperlinks 225 may be ranked according to their respective seller trust rating (STR). For example, the hyperlink 225*a* corresponding to a first-ranked seller may be moved to a first position on the GUI (Step 380). In one embodiment, the first position may be the top position on the seller listing 220, e.g., where the seller listing is displayed in a page format or drop-down menu. In another embodiment, the first position may be, e.g., a central position on the seller listing, for example, where the seller listing is displayed in a wheel format.

In Step 390, the hyperlinks 225*b* et seq. corresponding to the second and subsequently ranked hyperlinks may be moved to second and subsequent positions, respectively, on the GUI (FIG. 2C). The buyer may then use the GUI to select a seller from the seller listing 220, based upon, e.g., price, promised delivery date (PDD), and/or seller trust rating (STR).

After selecting a seller from the seller listing 220 (FIG. 2C), the user may be returned to the Single Display Page (SDP) (FIG. 2B) which now shows information related to the selected seller, including, e.g., the selected seller's price and promised delivery date (PDD). Upon receiving the SDP, the user device may further interact with the SDP to complete the transaction. For example, a user of the requesting user device may click or otherwise interact with a "Place in Cart" button on the SDP. This adds the product to a shopping cart associated with the user. The user device may transmit this request to add the product to the shopping cart to external front-end system 103.

Figure 2D:
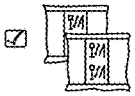
FIG. 2D depicts a sample Cart page that includes items in a virtual shopping cart along with interactive user interface elements, consistent with the disclosed embodiments.
Figure 2E:
FIG. 2E depicts a sample Order page that includes items from the virtual shopping cart along with information regarding purchase and shipping, along with interactive user interface elements, consistent with the disclosed embodiments.

External front-end system 103 may generate a Cart page (e.g., FIG. 2D). In some embodiments, the Cart page lists the products that the user has added to a virtual "shopping cart." A user device may request the Cart page by clicking on or otherwise interacting with an icon on the SRP, SDP, or other pages. In some embodiments, the Cart page may list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front-end system 103.

External front-end system 103 may then generate an Order page (e.g., FIG. 2E) in response to receiving the request to initiate a purchase. In some embodiments, the Order page re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front-end system 103 may send the Order page to the user device.

The user device may enter information on the Order page and click or otherwise interact with a user interface element that sends the information to external front-end system 103. From there, external front-end system 103 may send the information to different systems in system 100 to enable the creation and processing of a new order with the products in the shopping cart.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system comprising:
a memory storing instructions; and
at least one processor programmed to execute the instructions to perform a method for arranging hyperlinks on a graphical user-interface (GUI) of a computerized system, the method comprising:
receiving, via the GUI, a user selection to display a plurality of hyperlinks, the hyperlinks corresponding to one or more nodes of a first set;
determining, by a processor, a rank of each hyperlink in the plurality of hyperlinks, wherein determining a rank comprises:
constructing a first bipartite graph between the one or more nodes of the first set and one or more nodes of a second set, the first set and the second set being mutually exclusive, wherein edges of the first bipartite graph are weighted according to a first criterium;
constructing a second bipartite graph between the one or more nodes of the first set and the one or more nodes of the second set, wherein edges of the second bipartite graph are weighted according to a second criterium, different from the first criterium;
aggregating the first bipartite graph and the second bipartite graph to form an aggregated bipartite graph; and
ranking the one or more hyperlinks ordinally according to an aggregate weight of the corresponding node in the aggregate bipartite graph;
automatically moving the first-ranked hyperlink to a first position on the GUI; and
automatically moving the second and subsequently ranked hyperlinks to second and subsequent positions, respectively, on the GUI.

2. The computer-implemented system of claim 1, wherein:
receiving a user selection to display a plurality of hyperlinks comprises receiving an input from a keyboard or pointing device.

3. The computer-implemented system of claim 1, wherein:
constructing a first bipartite graph between the one or more nodes of the first set and one or more nodes of a second set comprises constructing a first weighted adjacency matrix having elements corresponding to the weights of the edges in the first bipartite graph;
constructing a second bipartite graph between the one or more nodes of the first set and the one or more nodes of the second set comprises constructing a first weighted adjacency matrix having elements corresponding to the weights of the edges in the second bipartite graph.

4. The computer-implemented system of claim 1, wherein:
the one or more nodes of a first set correspond to sellers in an online marketplace;
the one or more nodes of a second set correspond to buyers in the online marketplace; and
the edges of the first bipartite graph are weighted according to a value of past transactions conducted between the respective buyer and seller.

5. The computer-implemented system of claim 4, wherein:
the edges of the second bipartite graph are weighted according to one of:
a duration of past transactions between the respective buyer and seller; and
a frequency of past transactions between a respective buyer and seller.

6. The computer-implemented system of claim 4, further comprising:

constructing a third bipartite graph between the one or more nodes of the first set and the one or more nodes of the second set, wherein edges of the third bipartite graph are weighted according to a third criterium, different from the first criterium and the second criterium; and aggregating the first bipartite graph and the second bipartite graph to form an aggregated bipartite graph further comprises aggregating the third bipartite graph with the first bipartite graph and the second bipartite graph.

7. The computer-implemented system of claim 6, wherein:

the edges of the second bipartite graph are weighted according to a duration of past transactions between the respective buyer and seller; and the edges of the third bipartite graph are weighted according to a value of past transactions conducted between the respective buyer and seller.

8. The computer-implemented system of claim 1, wherein:

aggregating the first bipartite graph and the second bipartite graph to form an aggregated bipartite graph comprises:

building a first weighted adjacency matrix corresponding to the first bipartite graph;

building a second weighted adjacency matrix corresponding to the second bipartite graph; and taking an algebraic sum of the first weighted adjacency matrix and the second weighted adjacency matrix.

9. The computer-implemented system of claim 8, wherein:

taking the algebraic sum of the first weighted adjacency matrix and the second weighted adjacency matrix comprises multiplying the first weighted adjacency matrix and the second weighted adjacency matrix by different coefficients.

10. A computer-implemented method for arranging hyperlinks on a graphical user-interface (GUI) of a computerized system, the method comprising:

receiving, via the GUI, a user selection to display a plurality of hyperlinks, the hyperlinks corresponding to one or more nodes of a first set;

determining, by a processor, a rank of each hyperlink in the plurality of hyperlinks, wherein determining a rank comprises:

constructing a first bipartite graph between the one or more nodes of the first set and one or more nodes of a second set, the first set and the second set being mutually exclusive, wherein edges of the first bipartite graph are weighted according to a first criterium;

constructing a second bipartite graph between the one or more nodes of the first set and the one or more nodes of the second set, wherein edges of the second bipartite graph are weighted according to a second criterium, different from the first criterium;

aggregating the first bipartite graph and the second bipartite graph to form an aggregated bipartite graph; and ranking the one or more hyperlinks ordinally according to an aggregate weight of the corresponding node in the aggregate bipartite graph;

automatically moving the first-ranked hyperlink to a first position on the GUI; and automatically moving the second and subsequently ranked hyperlinks to second and subsequent positions, respectively, on the GUI.

11. The computer-implemented method of claim 10, wherein:

receiving a user selection to display a plurality of hyperlinks comprises receiving an input from a keyboard or pointing device.

12. The computer-implemented method of claim 10, wherein:

constructing a first bipartite graph between the one or more nodes of the first set and one or more nodes of a second set comprises constructing a first weighted adjacency matrix having elements corresponding to the weights of the edges in the first bipartite graph;

constructing a second bipartite graph between the one or more nodes of the first set and the one or more nodes of the second set comprises constructing a first weighted adjacency matrix having elements corresponding to the weights of the edges in the second bipartite graph.

13. The computer-implemented method of claim 10, wherein:

the one or more nodes of a first set correspond to sellers in an online marketplace;

the one or more nodes of a second set correspond to buyers in the online marketplace; and the edges of the first bipartite graph are weighted according to a value of past transactions conducted between the respective buyer and seller.

14. The computer-implemented method of claim 13, wherein:

the edges of the second bipartite graph are weighted according to one of:

a duration of past transactions between the respective buyer and seller; and a frequency of past transactions between a respective buyer and seller.

15. The computer-implemented method of claim 13, wherein:

constructing a third bipartite graph between the one or more nodes of the first set and the one or more nodes of the second set, wherein edges of the third bipartite graph are weighted according to a third criterium, different from the first criterium and the second criterium; and aggregating the first bipartite graph and the second bipartite graph to form an aggregated bipartite graph further comprises aggregating the third bipartite graph with the first bipartite graph and the second bipartite graph.

16. The computer-implemented method of claim 15, wherein: the edges of the second bipartite graph are weighted according to a duration of past transactions between the respective buyer and seller; and the edges of the third bipartite graph are weighted according to a value of past transactions conducted between the respective buyer and seller.

17. The computer-implemented method of claim 10, wherein:

aggregating the first bipartite graph and the second bipartite graph to form an aggregated bipartite graph comprises:

building a first weighted adjacency matrix corresponding to the first bipartite graph;

building a second weighted adjacency matrix corresponding to the second bipartite graph; and taking the algebraic sum of the first weighted adjacency matrix and the second weighted adjacency matrix.

18. The computer-implemented method of claim 17, wherein:

taking the algebraic sum of the first weighted adjacency matrix and the second weighted adjacency matrix comprises multiplying the first weighted adjacency matrix and the second weighted adjacency matrix by different coefficients.

19. A non-transitory computer-readable storage medium that comprises instructions for arranging hyperlinks on a graphical user-interface (GUI) of a computerized system, which instructions, when executed by a processor, become operational to perform a method comprising:

receiving, via the GUI, a user selection to display a plurality of hyperlinks, the hyperlinks corresponding to one or more nodes of a first set;

determining, by a processor, a rank of each hyperlink in the plurality of hyperlinks, wherein determining a rank comprises:

constructing a first bipartite graph between the one or more nodes of the first set and one or more nodes of a second set, the first set and the second set being mutually exclusive, wherein edges of the first bipartite graph are weighted according to a first criterium;

constructing a second bipartite graph between the one or more nodes of the first set and the one or more nodes of the second set, wherein edges of the second bipartite graph are weighted according to a second criterium, different from the first criterium;

aggregating the first bipartite graph and the second bipartite graph to form an aggregated bipartite graph; and ranking the one or more hyperlinks ordinally according to an aggregate weight of the corresponding node in the aggregate bipartite graph;

automatically moving the first-ranked hyperlink to a first position on the GUI; and automatically moving the second and subsequently ranked hyperlinks to second and subsequent positions, respectively, on the GUI.

* * * * *

UNITED STATES PATENT AND TRADEMARK OFFICE
CERTIFICATE OF CORRECTION

Page 1 of 2

PATENT NO. : 10,460,359 B1
APPLICATION NO. : 16/367891
DATED : October 29, 2019
INVENTOR(S) : Xiaojun Huang It is certified that error appears in the above-identified patent and that said Letters Patent is hereby corrected as shown below:

On the Title Page

Item (57) Abstract, Line 12, "criterium" should read as --criterion--.

Item (57) Abstract, Line 16, "second criterium," should read as --second criterion,--.

Item (57) Abstract, Line 16, "first criterium." should read as --first criterion.--.

In the Specification

Summary, Column 2, Line 36, "criterium" should read as --criterion--.

Summary, Column 2, Line 40, "second criterium," should read as --second criterion,--.

Summary, Column 2, Line 40, "first criterium." should read as --first criterion.--.

Summary, Column 2, Lines 60-61, "criterium" should read as --criterion--.

Summary, Column 2, Line 64, "second criterium," should read as --second criterion,--.

Summary, Column 2, Line 65, "first criterium." should read as --first criterion.--.

Summary, Column 3, Line 21, "criterium" should read as --criterion--.

Summary, Column 3, Line 25, "second criterium," should read as --second criterion,--.

Summary, Column 3, Line 25, "first criterium." should read as --first criterion.--.

Detailed Description, Column 10, Line 57, "criterium" should read as --criterion--.

Signed and Sealed this
Thirty-first Day of March, 2020

Andrei Iancu
*Director of the United States Patent and Trademark Office*

CERTIFICATE OF CORRECTION (continued)
U.S. Pat. No. 10,460,359 B1

Detailed Description, Column 10, Line 61, "criterium" should read as --criterion--.

In the Claims

Claim 1, Column 14, Line 14, "criterium;" should read as --criterion;--.

Claim 1, Column 14, Line 19, "second criterium," should read as --second criterion,--.

Claim 1, Column 14, Line 20, "first criterium." should read as --first criterion.--.

Claim 6, Column 15, Line 4, "criterium," should read as --criterion,--.

Claim 6, Column 15, Line 5, "first criterium" should read as --first criterion--.

Claim 6, Column 15, Lines 5-6, "second criterium;" should read as --second criterion;--.

Claim 15, Column 16, Line 41, "criterium," should read as --criterion,--.

Claim 15, Column 16, Line 42, "first criterium," should read as --first criterion,--.

Claim 15, Column 16, Lines 42-43, "second criterium;" should read as --second criterion;--.

Claim 19, Column 18, Line 2, "criterium;" should read as --criterion;--.

Claim 19, Column 18, Line 7, "criterium," should read as --criterion,--.

Claim 19, Column 18, Line 8, "first criterium;" should read as --first criterion;--.